Patented May 23, 1944

2,349,270

UNITED STATES PATENT OFFICE 2,349,270

PURIFICATION OF SLUDGES, SCUMS, AND THE LIKE TO PREPARE RELATIVELY PURIFIED TOCOPHEROL

Kenneth C. D. Hickman, Rochester, N. Y., assignor to Distillation Products, Inc., Rochester, N. Y., a corporation of Delaware No Drawing. Application August 24, 1940, Serial No. 354,113

4 Claims. (Cl. 260—333)

This invention relates to improved procedure for purifying substances of the nature of tocopherol which I have found in volatile products derived from purification and inert gas treatment of vegetable and animal oils.

In my U. S. application 321,913, filed March 2, 1940, of which this application is a continuation-in-part, I have described scums, sludges, and volatile condensates derived from distillation and/or carrier gas treatment of vegetable or animal oils, which contain tocopherol. Various methods for isolating this substance are also described.

This invention has for its object to provide a cheap, simple, and efficient method for isolating valuable antioxidant and thereapeutic substances of the nature of tocopherol from volatile products derived from vegetable or animal oils and occurring in by-products of the nature of scum, soap stock, or hot well sludge, or fractions or distillates thereof. Another object is to provide an improved method for preparing purified antioxidants from clabber stock, hot well scum, and trap scum, all of which are derived from inert or carrier gas treatment including hydrogenation of vegetable and animal oils. Other objects will appear hereinafter.

These and other objects are accomplished in accordance with my invention which includes subjecting the sludge, scum or the like, or fraction thereof from which the tocopherol is to be isolated, to a treatment with chemical agents which will liberate the tocopherol from its combination or association with the components of the mixture, such as free fatty acids, soaps, hydrocarbons, and other impurities, and then extracting the treated material with a solvent for tocopherol.

In the following description I have set forth several of the preferred embodiments of my invention, however it is to be understood that they are given for the purpose of illustration and that my invention is not restricted thereto.

The sludge, scum, or like material is preferably subjected to a chemical treatment which will saponify the impurities. Saponification has been found to be a quite satisfactory method of treatment in spite of the fact that it has heretofore been considered that alkali was harmful to tocopherol and caused destruction thereof. I have found that such destruction does not take place if treatment with the alkali is carried out in a reasonably careful manner so as to avoid oxidation. Of course, the saponification mixture should not be left to stand in contact with air for long periods of time. If the treatment is carried out in a reasonably expeditious manner, little or no loss takes place. This is true even though the saponification treatment is carried out in the presence of air.

The saponification is accomplished by adding a base in amounts sufficient to saponify acids and glycerides present in the sludge or the like. Bases such as potassium hydroxide, carbonate, and the like are preferred. It is best for commercial operations to use soda lye or slacked lime, while for laboratory operations bases in the presence of an alcohol, such as a mixture of alcohol and potassium hydroxide may be best. After addition of the base, the mixture is preferably refluxed until the reaction is substantially completed. A steam bath is a convenient method of heating and the reaction is usually complete within about one hour.

The saponified mixture is then extracted with several portions of a solvent for tocopherol, such as ethyl ether, petroleum ether or amyl acetate. The solvent extract is then washed with water to remove soaps, dried, and the solvent distilled off. The undistilled residue constitutes a relatively concentrated tocopherol product. It can be used as such. However, it contains sterols and these can be easily removed by dissolving the material in a solvent such as methyl alcohol, ethyl formate or ethyl acetate and chilling to a low temperature, such as dry ice temperature, until the sterols have been substantially precipitated. The sterols are then filtered off and the solvent is removed by distillation.

By a modification of my procedure, I may first subject the sludge, scum or the like material to a distillation treatment under high vacuum in order to collect a fraction containing the tocopherol in somewhat purified form. I prefer to employ high vacuum, unobstructed path distillation conditions for this purpose. High vacuum unobstructed path distillation is well known in the distillation art. It comprises distillation under conditions such that the vaporizing and condensing surfaces are separated by substantially unobstructed space a high vacuum existing in the space between the two surfaces. This fraction then may be subjected to the foregoing purification treatment. Purification in this manner results in a recovery of 85% of the tocopherol contained in the sludge or scum.

The tocopherol concentrate prepared in accordance with the foregoing procedure has a content of between 25 and 50% tocopherol and may have a somewhat dark color. It may be distilled under high vacuum, unobstructed path conditions in which case the dark color is left behind in the residue. The color of the fractions is a light yellow-orange and a blend of all of the fractions gives a tocopherol product containing at least 25% tocopherol.

Another chemical treatment which may be employed in place of the saponification is acidification of the sludge or scum in order to release the tocopherol. This causes a breakdown of the calcium and like soaps in the sludge and enables improved removal of the tocopherol content by solvent extraction or distillation. The acidification treatment is accomplished by adding a mineral acid, such as dilute hydrochloric or sulfuric acids. After thorough stirring and settling, the acid layer is removed and discarded. The product then may be subjected to solvent extraction as described to separate the tocopherol content thereof.

A further modification which has advantages is to treat the sludge, scum, or the like or distillates thereof with powerful reducing agents in order to reduce any tocopherol quinone to the alcohol form. It is known that tocopherol can be oxidized to a quinone which is less valuable. I have found that this quinone form can be reduced to the hydroquinone form and that this improves the yield of active tocopherol. This is probably due to the fact that the tocopherol is converted into a form in which it is more stable during the subsequent purification procedures. The reducing treatment is preferably applied at the start of the purification procedure. However, it is to be understood that my invention is not restricted to this step and that the material can be reduced at any intermediate stage or simultaneously with the foregoing purification procedure if desired. The reduction can be accomplished by catalytic hydrogenation, but a simple method is to introduce a metal, such as zinc or iron, into the sludge as it is obtained. The free fatty acids present in the sludge react with the metal to give hydrogen which in turn reduces the tocopherol quinone. The mixture is preferably permitted to stand for about 24 hours. This period can be shortened by adding a mineral acid such as hydrochloric or sulfuric to the mixture. Other materials which give rise to nascent hydrogen or which have a reducing action, such as aluminum plus alkali, sodium plus alcohol, stannic chloride and sodium hydrosulfite may be used.

*Example I*

800 pounds of hotwell sludge containing 4 per cent tocopherol were mixed with 500 pounds of good quality slacked lime and 20 pounds of zinc dust. The mixture was intimately stirred and warmed until reaction began. The mixture then became hot of its own accord and set to a nearly solid mass. The mass was subsequently broken up and extracted with 3,000 pounds of ethyl ether. The ether extract was washed four times with water and dried with sodium sulfate. The ether was distilled off and the residual oil dissolved in five times its bulk of methyl alcohol and chilled to 0-10° C. for 12 hours. Sterols were filtered off and the methyl alcohol evaporated. 25 pounds of sterols were so obtained. 65 pounds of an oil were obtained containing 25 per cent of mixed tocopherols measured by red value. The total recovery of tocopherol exceeded 50 per cent of that in the starting material.

*Example II*

Sludge or scum obtained from the steam condensate of a vegetable oil refinery was acidified with 1/20 of its bulk of concentrated hydrochloric acid and was agitated for 15 minutes at the boiling point with 1/100 its weight of iron filings. The mixture was allowed to stand and the hydrochloric acid and iron salts filtered off. A second similar quantity of hydrochloric acid was stirred in for half an hour, the mixture allowed to stand, and the acid drained off. The batch was then washed four times with an equal volume of boiling water. The mixture was allowed to settle and as much water as possible drained away. The fat was dried by passing through the centrifuge or other convenient means. The dry fat was then passed through a high-vacuum still and the portion that distilled over below 120° C. at .1 mm. was rejected. The portion coming over between 120-190° at .001 mm. to .1 mm. was collected. The distillate was found to have a tocopherol content of 15 per cent and an acid value of 7. 200 grams of the distillate were mixed with 50 grams of zinc dust, 100 grams of potassium hydroxide and 300 cc. of ethyl alcohol. The mixture was refluxed on the steam bath for one hour. The saponification mixture was extracted three times with two volumes of ethyl ether. The ether solution was washed four times with water to remove soap, dried with sodium sulfate and the ether evaporated. The residue was mixed with 20 times its weight of ethyl acetate and chilled to $-60°$ C. for 16 hours. The precipitated sterols were removed and the solvent distilled off. The residue contained 32 per cent of tocopherol, representing a yield of 80 per cent of the tocopherol in the crude distillate before saponification.

*Example III*

800 grams of hot well sludge with 4% tocopherol content were heated on the steam bath and 300 grams of KOH dissolved in 2 liters of ethyl alcohol were added and the whole stirred and heated for 1 hour. An equal volume of water was then added and the solution extracted four times with a total of 10 lbs. of ethyl ether. The ether extract was washed four times with water to remove all soap. The ether solution was dried over anhydrous $Na_2SO_4$ and the ether distilled off. The oil residue was then dissolved in methyl acetate to form a 5% solution and the sterols frozen out at dry ice temperature for 15 hours. The sterols were filtered off and the methyl acetate was distilled off. 31 grams or 3.9% of sterols were obtained. 68.5 grams or 8.6% oil with a tocopherol potency of 25% were obtained. The recovery of tocopherol was 54% of the starting material.

It is customary to subject many vegetable and animal oils to a catalytic hydrogenation treatment. In the commercial operation of such processes, the hydrogen is continuously withdrawn from the reaction chamber and is subjected to various treatments to remove volatile components derived from the oil. This hydrogen may be withdrawn in small amounts to a condenser where the volatile condensable matter is condensed out. My invention is applicable to this condensed material. Other carrier gas treatments of vegetable and animal oils, such as steam distillation to deodorize result in volatile matter being carried over with the gas. In the case of a steam deodorization plant, this volatile matter is condensed either in an interstage condenser in which case it is known as trap scum, or in the hot well of the ejector in which case it is known as hot well sludge or scum. Also, it is common procedure to subject vegetable and animal oils to alkali refining to precipitate a sludge which has been separated and used for soap manufacture and which is known as soap stock. My invention is in general applicable to the purification of all such products.

Reference is made to my copending Hickman application 321,913, mentioned above, which relates to the separation of tocopherol from deodrizer scum.

What I claim and desire to be secured by Letters Patent of the United States is:

1. The process for separating tocopherol from refinery scum, which scum is condensed from the inert gas employed during the vacuum deodorization of an animal or vegetable oil which contains tocopherol which process comprises subjecting the scum to a chemical treatment which will release the tocopherol contained therein and enable its separation from the balance of the impurities present and then extracting this mixture with a solvent for tocopherol.

2. The process for separating relatively purified tocopherol from refinery scum, which scum is condensed from the steam employed during the vacuum steam deodorization of a vegetable or animal oil which process comprises saponifying the scum, and then extracting the saponification mixture with a solvent for tocopherol.

3. The process for separating purified tocopherol from refinery scum, which is derived from the volatile matter condensed from the steam employed in deodorizing a vegetable or animal oil which process comprises subjecting the scum, to high vacuum, unobstructed path distillation, separating a distillate fraction containing tocopherol, subjecting this fraction to saponification and then extracting the saponification mixture with a solvent for tocopherol.

4. The process for separating relatively purified tocopherol from refinery scum, which scum is condensed from the steam employed during the vacuum steam deodorization of a vegetable oil which process comprises subjecting the scum to a reducing treatment, subjecting the reduced scum, to a saponification treatment and then separating the tocopherol therefrom by extraction with a solvent for tocopherol.

KENNETH C. D. HICKMAN.